United States Patent [19]

Walker et al.

[11] 4,142,283

[45] Mar. 6, 1979

[54] TORSION SPRING WRENCH

[76] Inventors: Donald R. Walker, 2729 S. 114th E. Ave., Tulsa, Okla. 74129; Thomas E. Walker, 6930 E. 7th, Tulsa, Okla. 74112

[21] Appl. No.: 799,348

[22] Filed: May 23, 1977

[51] Int. Cl.[2] .................. B23P 19/04

[52] U.S. Cl. .................. 29/227

[58] Field of Search .................. 29/227, 225, 229, 240; 81/90 R, 90 C, 119, 120, 121 R

[56] References Cited

U.S. PATENT DOCUMENTS

| | | | |
|---|---|---|---|
| 1,803,518 | 5/1931 | White | 29/227 |
| 1,866,782 | 7/1932 | White | 29/227 |

FOREIGN PATENT DOCUMENTS

| | | | |
|---|---|---|---|
| 353977 | 7/1905 | France | 81/90 C |
| 1099828 | 3/1955 | France | 81/90 B |
| 207260 | 11/1923 | United Kingdom | 81/90 B |

*Primary Examiner*—James L. Jones, Jr.

*Attorney, Agent, or Firm*—Head, Johnson & Chafin

[57] ABSTRACT

A C-shaped or ring-shaped collar member having a groove along the inner periphery of one end in combination with an adjustable pin insert for engaging the end of a torsion spring threaded on a cone. Apertures are provided in the collar for accepting a winding bar to rotate the collar.

7 Claims, 12 Drawing Figures

TORSION SPRING WRENCH

BACKGROUND OF THE INVENTION

Torsion springs are used in a wide variety of residential and commercial applications. Perhaps the most common use is in providing a counterbalancing force for overhead doors and the like. In the latter application, a length of torsion spring is coiled around a rotatably mounted horizontal shaft. One end of the spring is tightly threaded on a "cone" or "plug", as it is sometimes called, which is rigidly secured to the torsion shaft and the other end of the spring is fixed in a stationary position. A cable drum is securely fastened to the torsion shaft and a length of cable extends from the drum to the overhead door. As the door is lowered, cable is rolled from the drum, rotating the shaft and placing the spring in torsion, thus storing part of the potential energy due to the weight of the door. In elevating the door, the spring exerts an upward force transmitted through the torsion shaft, drum and cable to assist in raising the door, thus reducing the outside force required.

As previously noted, at least one of the torsion spring ends is normally threaded on a "cone" secured to the shaft. The spring is mounted so as to tighten upon the cone during usage. Should the spring break either as a result of a defect in manufacture or as a result of long usage, it becomes very difficult to remove the broken spring section from the cone. The broken spring section is usually threaded upon the cone so firmly that it becomes necessary to cut the spring with an acetylene torch, which will ruin an aluminum cone in the process; and if a pipe wrench is used to remove the spring, the wrench jaws are easily destroyed.

It is therefore an object of this invention to provide an inexpensive device for easily removing a broken torsion spring section from a cone without the necessity of cutting or burning the cone and leaving same intact for future use.

Summary of the Invention

This invention contemplates a new and useful wrench for the removal of torsion springs from cones without the necessity of cutting or burning same.

The wrench comprises a ring or C-shaped collar member having a groove along the inner periphery of one end thereof and an adjustable pin insert for engaging the end of the spring section abutting the cone base. Apertures are provided in the collar so that adequate leverage may be achieved for rotating the collar to unthread the spring section with a standard winding bar.

DETAILED DESCRIPTION OF PREFERRED EMBODIMENT

Figure 1:
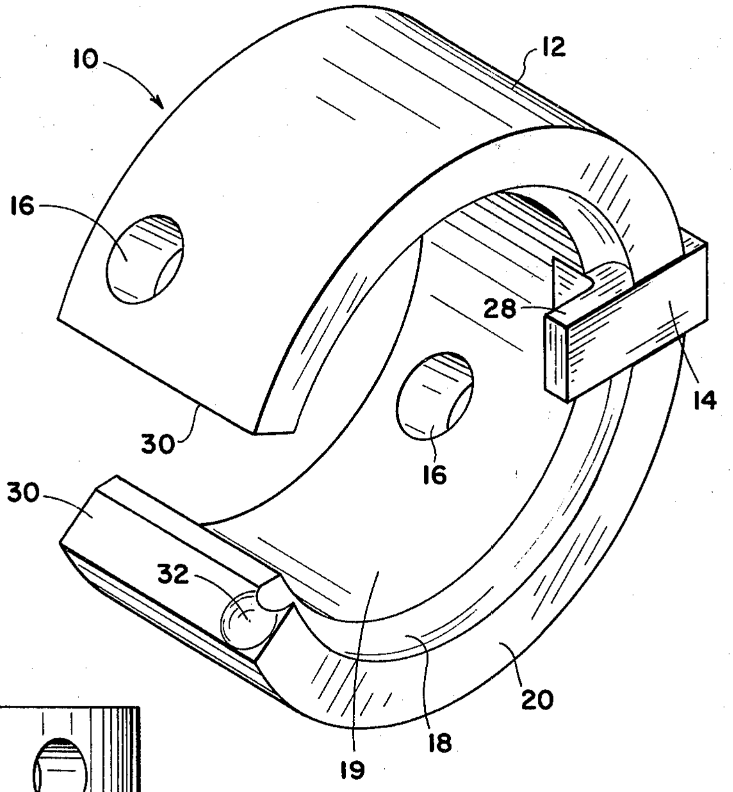
FIG. 1 is a perspective view of one embodiment of the invention.
Figure 2:
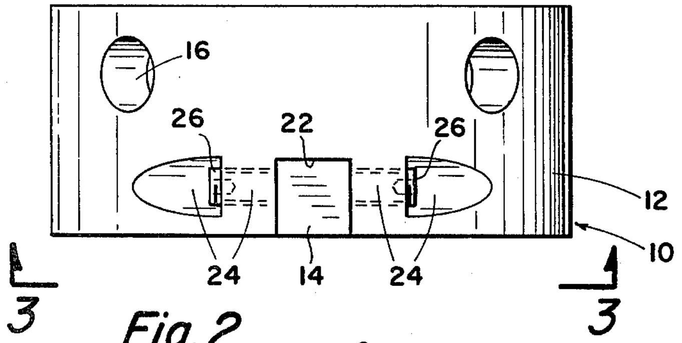
FIG. 2 is an elevational view of the wrench collar showing the pin in place.
Figure 3:
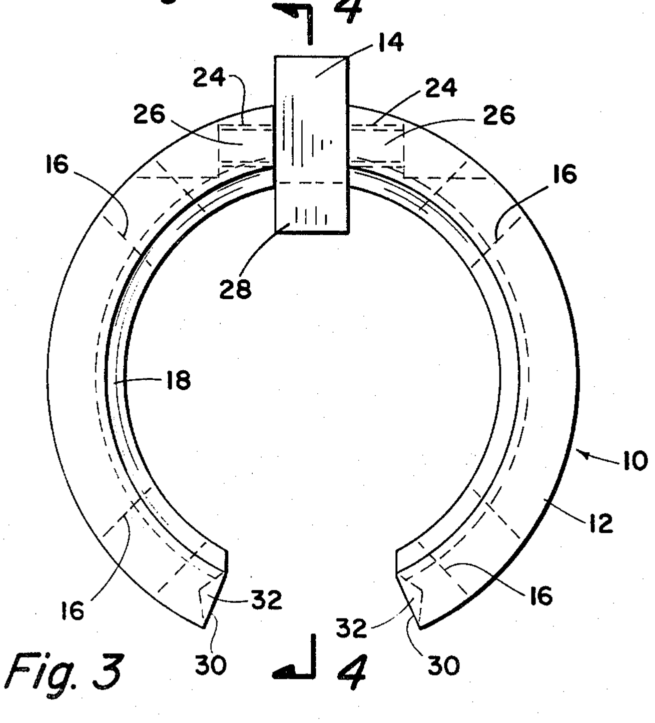
FIG. 3 is an elevational view of the embodiment taken along line 3—3 of FIG. 2.
Figure 4:
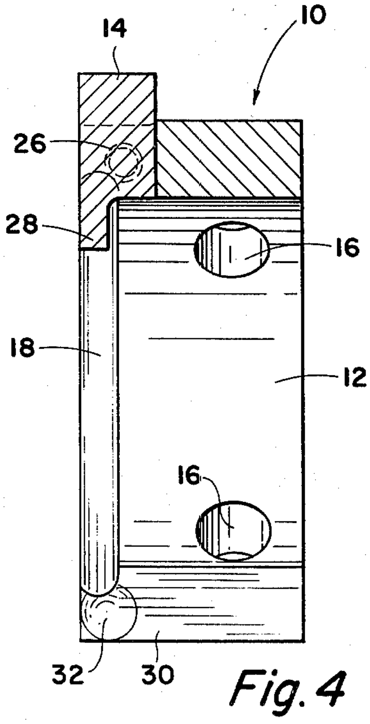
FIG. 4 is an elevational view, partly in section, taken along line 4—4 of FIG. 3.

Referring to the drawings, and in particular to FIG. 1 thereof, there is shown a perspective view of one preferred embodiment of the invention. The wrench, generally characterized by reference numeral 10, is basically comprised of two parts, a C-shaped collar 12 and a pin 14. At least one, but preferably four, apertures 16 are radially drilled through the collar 12 for receiving a round bar tool (not shown). A groove 18 is formed along the inner periphery 19 of one end 20 of collar 12. The bottom of the groove 18 is preferably arcuate in shape for receiving the workpiece as will be explained in detail later. An elevational view of the embodiment shown in FIG. 2 shows the rabbet cut 22 which is made generally perpendicular to the outer collar surface in the end 20 thereof for receiving pin 14. A pair of threaded bores 24 pass from the outer periphery of the collar to the rabbet cut as shown in FIGS. 2 and 3. Once the pin 14 is placed in position in the rabbet cut 22, set screws 26, threaded in bores 24, are tightened to hold the pin in place. Pin 14, as shown in FIGS. 1 and 4 is basically a block of metal having a tang 28 projecting therefrom of a thickness approximately equal to the width of the peripheral groove 18.

The edges 30 of collar 12 have slight recesses 32 therein in substantial alignment with peripheral groove 18 for reasons which will be explained later.

Figure 5:
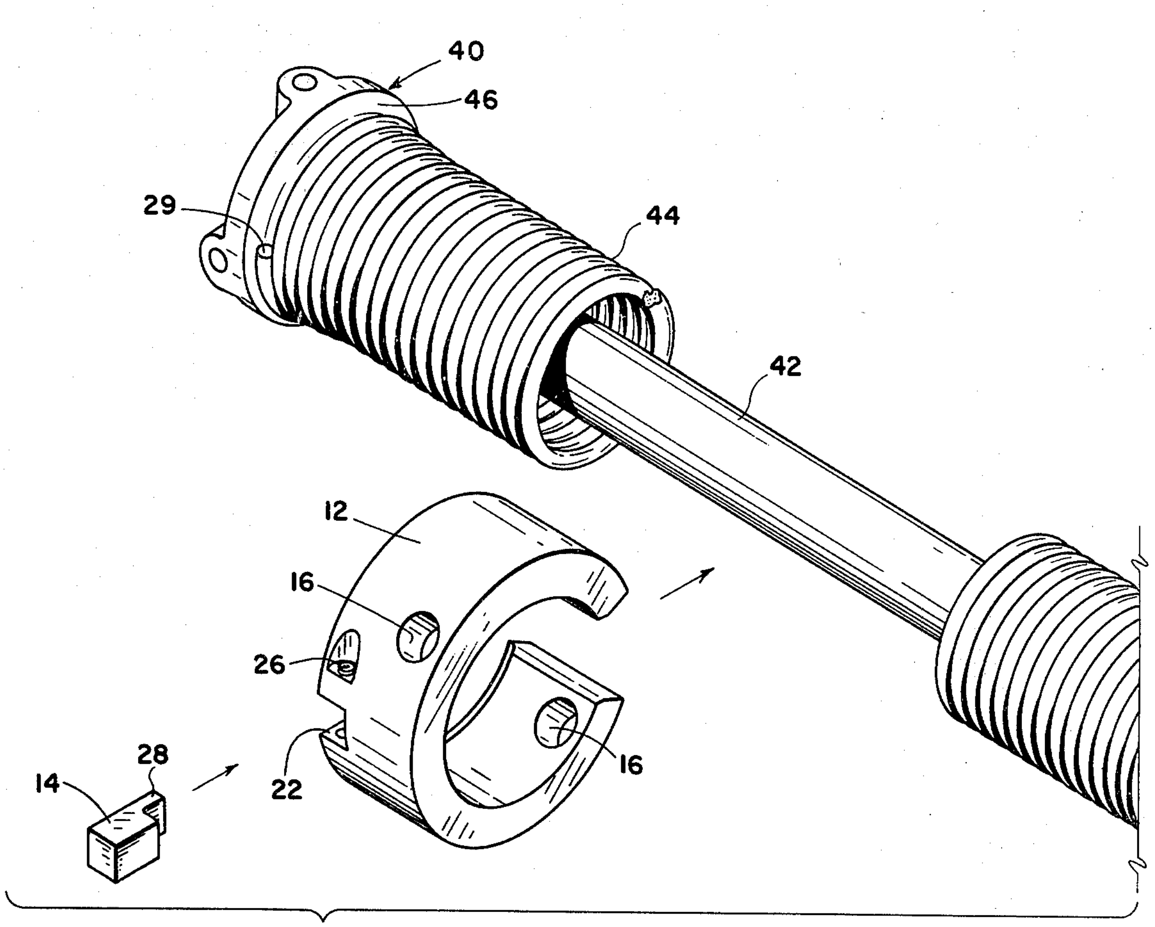
FIG. 5 is a perspective view of the wrench collar and pin in relation to a torsion system.
Figure 6:
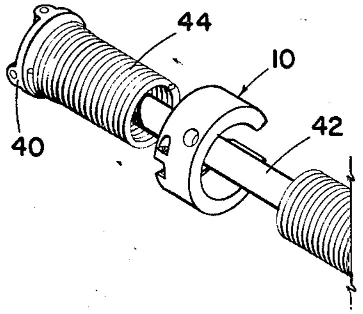
FIGS. 6–8 are illustrative views of the wrench operation.
Figure 7:
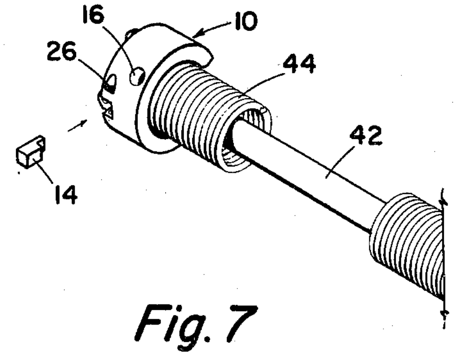
Figure 8:
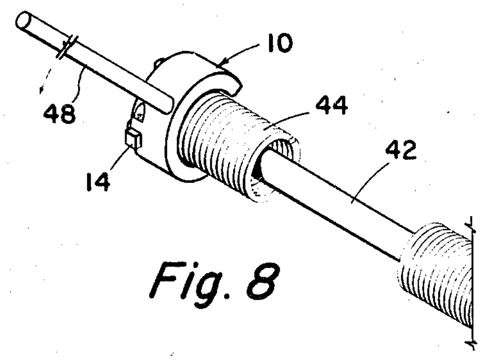
Figure 9:
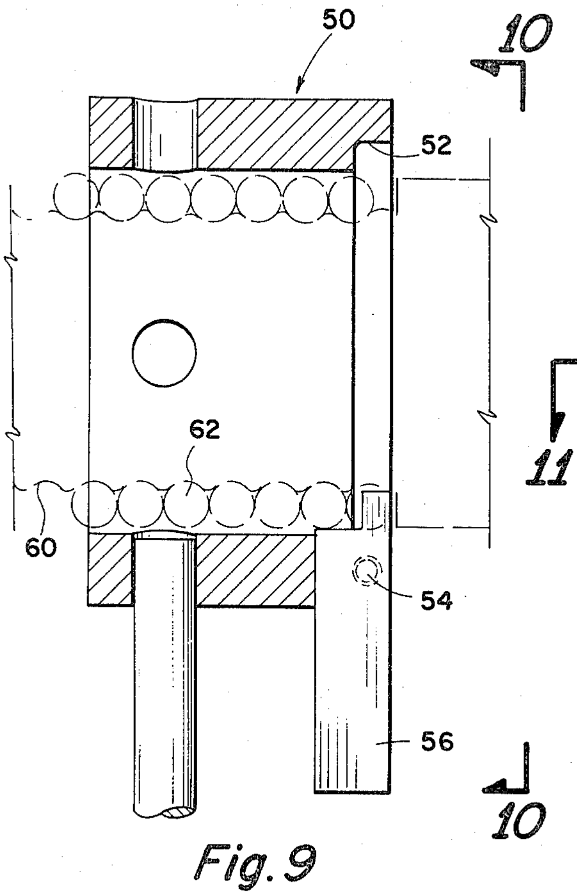
FIG. 9 is an elevational view of a second wrench embodiment.
Figure 10:
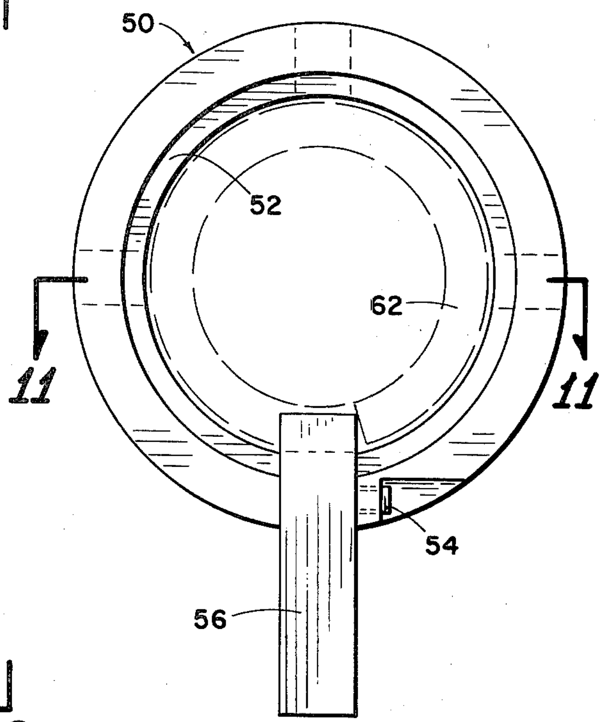
FIG. 10 is an elevational view taken along line 10—10 of FIG. 9.
Figure 11:
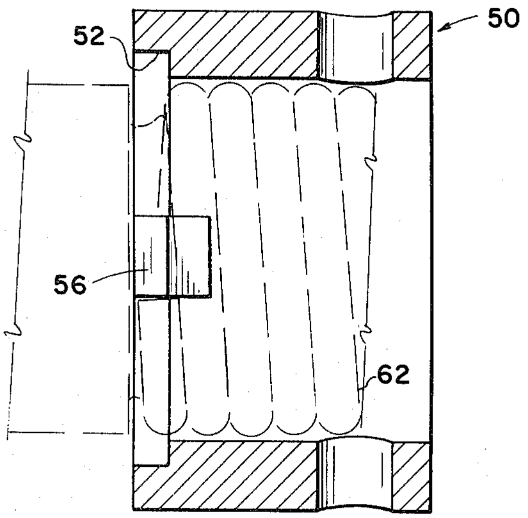
FIG. 11 is an elevational view, partly in section, taken along line 11—11 of FIG. 10.
Figure 12:
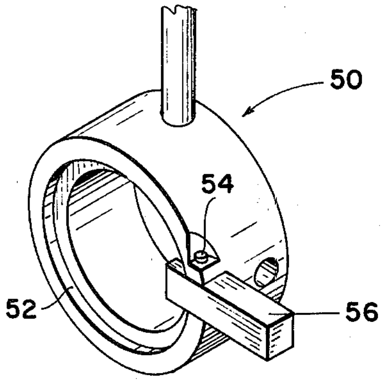
FIG. 12 is a perspective view of the second embodiment with the winding bar in place.

FIGS. 5–8 of the drawings are perspective views of the wrench 10 in working relationship with an overhead door torsion system. As shown in FIG. 5, a cone generally indicated by reference numeral 40 is mounted on torsion shaft 42, and a broken section spring 44 is threaded on the cone flush with the cone base 46. The circumferential opening of the C-shaped collar permits the wrench to be slipped over the torsion shaft as shown in FIG. 6 and moved along the shaft axis over the spring section to the cone base as shown in FIG. 7. Pin 14 is inserted in rabbet cut 22 and held in place by tightening set screws 26 so that the tang 28 thereof will engage the end 29 of broken spring section 44. A suitable winding bar 48, as shown in FIG. 8, is then inserted into aperture 16 of wrench 10 to provide the leverage necessary to unthread the spring section 44 from cone 40.

Some torsion springs have a length of straight wire protruding from the last wind on the cone. With such springs, the pin 14 is not used, and the wire is retained by recess 32.

A second embodiment of the wrench is shown in FIGS. 9–12 of the drawings. In this embodiment, the wrench collar 50 is closed rather than open as in the preceding embodiment. Although the wrench may not be used without direct access to the end of the torsion shaft, such an embodiment is slightly more economical to manufacture and is suitable for shop work use. It should also be noted that the peripheral groove 52 is square set rather than arcuate and that a single set screw 54 is used to hold pin 56 in place. The cone 60 and broken spring section 62 are shown by broken lines.

Whereas the present invention has been described in particular relation to the drawings attached hereto, it should be understood that other and further modifications, apart from those shown or suggested herein may be made within the spirit and scope of this invention.

What is claimed is:

1. A wrench for removing a torsion spring from a cone which comprises:
   a unitary substantially C-shaped collar having a groove along the inner periphery of one end thereof, at least one radial aperture therethrough, and a radially directed rabbet through the collar end in the proximity of the groove; and
   pin means slidably adjustable in the rabbet for axially engaging the end of the torsion spring abutting the cone base to apply axial pressure against the spring for releasing the spring from the cone.

2. A wrench, as recited in claim 1, wherein the C-shaped collar also has a recess in the collar edge substantially aligned with the peripheral groove.

3. A wrench, as recited in claim 1, wherein the collar also has a threaded bore extending from the outer periphery of the collar to the rabbet.

4. A wrench for removing a torsion spring from a cone which comprises:
   a unitary collar having a groove along the inner periphery of one end thereof, at least one radial aperture therethrough, and a radially directed rabbet through the collar end in the proximity of the groove; and
   pin means slidably adjustable in the rabbet for axially engaging the end of the torsion spring abutting the cone base to release the spring from the cone.

5. A wrench, as recited in claim 4, wherein the collar also has a theaded bore extending from the outer periphery of the collar to the rabbet.

6. A wrench for removing a torsion spring from a cone which comprises:
   a substantially C-shaped collar having a groove along the inner periphery of one end thereof, at least one radial aperture therethrough, and a radially directed rabbet through the collar end in the proximity of the groove; and
   pin means slidably adjustable in the rabbet for engaging the end of the torsion spring abutting the cone base wherein the collar also has a threaded bore extending from the outer periphery of the collar to the rabbet, and further comprising a set screw threaded in the bore for holding the pin means in position.

7. A wrench for removing a torsion spring from a cone which comprises:
   a collar having a groove along the inner periphery of one end thereof, at least one radial aperture therethrough, and a radially directed rabbet through the collar end bearing the groove; and
   pin means slidably adjustable in the rabbet for engaging the end of the torsion spring abutting the cone base, wherein the collar also has a threaded bore extending from the outer periphery of the collar to the rabbet, and further comprising a set screw threaded in the bore for holding the pin means in position.

* * * * *